(12) United States Patent
Fan et al.

(10) Patent No.: US 10,797,502 B2
(45) Date of Patent: Oct. 6, 2020

(54) CHARGING METHOD AND ELECTRONIC DEVICES

(71) Applicant: Beijing Xiaomi Mobile Software Co., Ltd., Haidian District, Beijing (CN)

(72) Inventors: Jie Fan, Beijing (CN); Chang Yu Sun, Beijing (CN); Ning Chao Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 245 days.

(21) Appl. No.: 15/789,116

(22) Filed: Oct. 20, 2017

(65) Prior Publication Data
US 2018/0115179 A1    Apr. 26, 2018

Related U.S. Application Data

(63) Continuation of application No. PCT/CN2016/102937, filed on Oct. 21, 2016.

(51) Int. Cl.
*H02J 7/00* (2006.01)
*H02J 50/10* (2016.01)
(Continued)

(52) U.S. Cl.
CPC ............ *H02J 7/0072* (2013.01); *G06F 1/266* (2013.01); *H02J 7/025* (2013.01); *H02J 50/10* (2016.02);
(Continued)

(58) Field of Classification Search
CPC ........ H02J 7/0072; H02J 7/025; H02J 7/0029; G06F 1/266
(Continued)

(56) References Cited

U.S. PATENT DOCUMENTS

| 6,075,339 A * | 6/2000 | Reipur | H01M 10/4257 320/110 |
| 6,424,123 B1 * | 7/2002 | Odaohhara | H02J 7/0073 320/134 |

(Continued)

FOREIGN PATENT DOCUMENTS

| CN | 101707384 A | 5/2010 |
| CN | 201690242 U | 12/2010 |

(Continued)

OTHER PUBLICATIONS

Extended European Search Report issued in corresponding European Application No. 17197565.9, dated Feb. 9, 2018, 11 pages.
(Continued)

*Primary Examiner* — Yalkew Fantu
(74) *Attorney, Agent, or Firm* — Arch & Lake LLP

(57) ABSTRACT

The present disclosure provides a charging method and an electronic device, in the field of electronic technology. The charging method is applied in electronic devices. The electronic device includes a charging circuit including a first charging path, a second charging path, and a parallel charging path operating, the method comprising: disconnecting the first charging path, when the charging circuit is in the first charging mode and the electronic device is detected to be connected to the second charging mode; obtaining a charging protocol used in the second charging mode; and determining whether to adopt the first charging path, the second charging path, or the parallel charging path to charge the electronic device according to the charging protocol.

20 Claims, 4 Drawing Sheets

(51) Int. Cl.
    *G06F 1/26* (2006.01)
    *H02J 7/02* (2016.01)
(52) U.S. Cl.
    CPC ......... *H02J 7/0029* (2013.01); *H02J 7/00034* (2020.01)
(58) Field of Classification Search
    USPC .......................................................... 320/137
    See application file for complete search history.

(56) References Cited

U.S. PATENT DOCUMENTS

| | | | |
|---|---|---|---|
| 7,375,491 B2* | 5/2008 | Lin | H02J 7/0073 320/107 |
| 8,957,632 B2 | 2/2015 | Gu | |
| 9,035,600 B2 | 5/2015 | Park et al. | |
| 9,350,183 B2 | 5/2016 | Park et al. | |
| 2008/0238357 A1* | 10/2008 | Bourilkov | H02J 7/0006 320/106 |
| 2011/0156636 A1 | 6/2011 | Kim | |
| 2011/0179292 A1 | 7/2011 | Clogg et al. | |
| 2012/0161697 A1 | 6/2012 | Park et al. | |
| 2012/0229084 A1* | 9/2012 | Gu | H02J 50/00 320/108 |
| 2014/0042984 A1* | 2/2014 | Yamada | H02J 7/0013 320/138 |
| 2014/0225558 A1 | 8/2014 | Park | |
| 2015/0236539 A1 | 8/2015 | Park et al. | |
| 2016/0087480 A1 | 3/2016 | Trudeau et al. | |
| 2016/0134185 A1* | 5/2016 | Wang | H02M 1/42 323/235 |
| 2018/0183335 A1* | 6/2018 | Fan | H02M 3/155 |

FOREIGN PATENT DOCUMENTS

| | | |
|---|---|---|
| CN | 103326407 A | 9/2013 |
| CN | 103532198 A | 1/2014 |
| CN | 104617620 A | 5/2015 |
| CN | 105656115 A | 6/2016 |
| WO | 2010129369 A2 | 11/2010 |

OTHER PUBLICATIONS

International Search Report (including English translation) and Written Opinion issued in corresponding International Application No. PCT/CN2016/102937, dated Jul. 28, 2017, 15 pages.
First Office Action (including partial English translation of Concise Explanation of Relevance) issued in corresponding Chinese Application No. 201680001223.7, dated Jun. 29, 2018, 7 pages.
Second office action (including partial English translation of Concise Explanation of Relevance) of Chinese application No. 201680001223.7 dated May 31, 2019, (12p).
Communication pursuant to Article 94 (3) EPC of EP application No. 17 197 565.9 dated Jun. 7, 2019, (7p).
Third Office Action of Chinese Application No. 201680001223.7 dated Jan. 22, 2020 with English translation, (12p).
Communication pursuant to Article 94 (3) EPC of EP Application No. 17197565.9 dated Mar. 19, 2020, (10p).

* cited by examiner

CHARGING METHOD AND ELECTRONIC DEVICES

CROSS-REFERENCE TO RELATED APPLICATION

This application claims priority to International Patent Application No. PCT/CN2016/102937, filed with the State Intellectual Property Office on Oct. 21, 2016 and titled "CHARGING METHOD AND ELECTRONIC DEVICES," the entire contents of which are incorporated herein by reference.

TECHNICAL FIELD

The present disclosure relates to the electronic technology, particularly a charging method and electronic devices.

BACKGROUND

With the continuous development of the electronic technologies, electronic devices like mobile phones, tablets, and laptop computers become an indispensable tool in people's daily life. Because battery capacity in an electronic device has a limit, with the increasing use of electronic devices, it is necessary to charge the device frequently in order to keep the device working normally.

For an electronic device, there are usually two commonly used charging methods: wired charging and wireless charging. Wired charging usually refers to charging the electronic device with charging device through USB (Universal Serial Bus) cable. Wireless charging refers to charging an electronic device with a wireless charging device by placing the electronic device at the transmitting end of the wireless charging device within the wireless charging range. When placed at the transmitting end of the wireless charging device, the electronic device can serve as a receiving end and couple with the transmitting end to sense the signal transmitted from the transmitting end and generate current, thereby charging electronic device. When an electronic device is charged with wired charging device and placed at the transmitting end of the wireless charging device within the wireless charging range, the electronic device can be charged with both wired and wireless charging device.

SUMMARY

In order to solve the problems in the relevant techniques, the embodiments of the present disclosure provide an electronic device and charging method thereof, as follows:

In a first aspect, a method of charging an electronic device is provided, wherein the electronic device comprises a charging circuit including a first charging path operating in a first charging mode, a second charging path operating in a second charging mode, and a parallel charging path operating simultaneously in the first charging mode and the second charging mode, the method comprising: disconnecting a first charging path, when the charging circuit is in the first charging mode and the electronic device is detected to be connected to the second charging mode; obtaining a charging protocol used in the second charging mode; and determining, whether to adopt the first charging path, the second charging path, and the parallel charging path to charge the electronic device according to the charging protocol.

In a second aspect, an electronic device is provided. The device includes a charging management module and a charging circuit. The charging circuit includes a first charging path, a parallel charging path, and a second charging path; the first charging path includes a first switch and a first charging interface, the first switch is connected with the first charging interface in the first charging path; the parallel charging path includes a second switch and a second charging interface, the second switch is connected with the second charging interface in the parallel charging path, and the second switch is connected with the first switch in the first charging path; the second charging path includes a third switch and the second charging interface, the third switch is connected with the second charging interface in the second charging path. The charging management module is configured to control the first charging path through the first switch, control the parallel charging path through the first switch and the second switch, and control the second charging path through the third switch.

The first charging path, the second charging path and the parallel charging path can be controlled through the first switch, the second switch and the third switch, to improve the switching flexibility among different charging modes and to optimize the charging performance.

It is to be understood that both the foregoing general description and the following detailed description are exemplary and explanatory only and are not restrictive of the present disclosure, as claimed.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
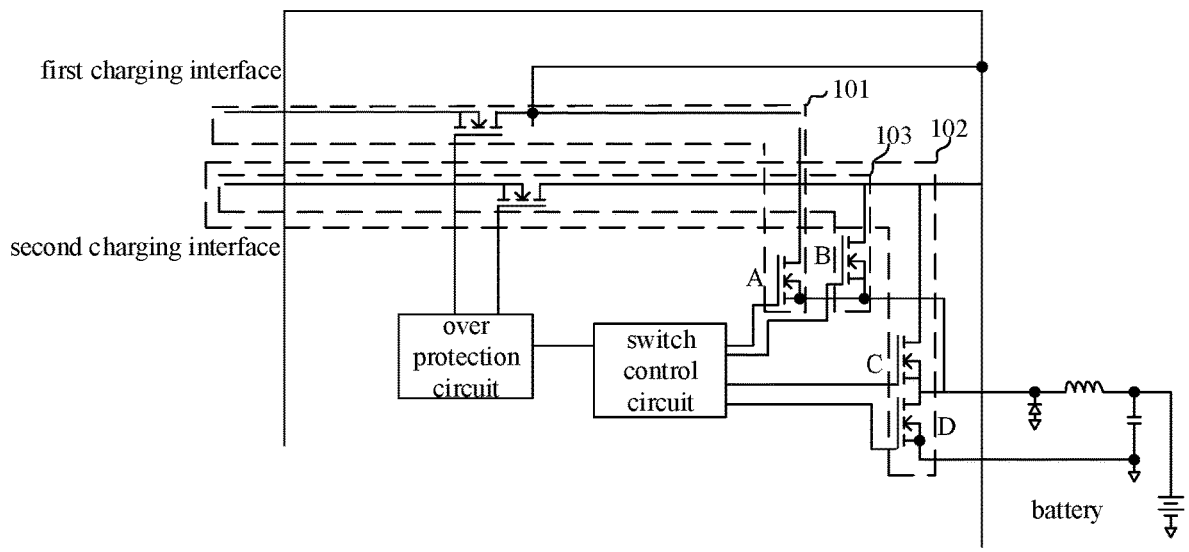
FIG. 1 is a schematic diagram of a charging circuit provided by an aspect of the present disclosure.

The present disclosure will be described in further detail with reference to the enclosed drawings, to clearly present the objects, technique solutions, and advantages of the present disclosure.

Hereinafter, embodiments will be described in detail, and the embodiments are shown in the drawings. In the following description when referring to the drawings, the same numerals in the different drawings denote the same or similar elements, unless otherwise indicated. The embodiments described are not representative of all embodiments consistent with the present disclosure. Rather, they are merely examples of devices and methods consistent with some aspects of the present disclosure as detailed in the claims.

The embodiments of the present disclosure provide a method of charging an electronic device, wherein the electronic device comprises a charging circuit including a first charging path operating in a first charging mode, a second charging path operating in a second charging mode, and a parallel charging path operating simultaneously in the first charging mode and the second charging mode, the charging circuit includes a first charging interface, a second charging interface, a first switch, a second switch, a third switch; wherein the first charging path includes the first switch and the first charging interface, the parallel charging path includes the second switch and the second charging interface, and the second charging path includes the third switch and the second charging interface, the electronic device further includes a charging management module.

In the first charging path, the first switch is connected with the first charging interface; in the parallel charging path, the second switch is connected with the second charging interface, and the first switch is connected with the second switch; in the second charging path, the third switch is connected with the second charging interface; the charging management module is configured to control the connection/disconnection of the first charging path through the first switch, control the connection/disconnection of the parallel charging path through the first switch and the second switch and control the connection/disconnection of the second charging path through the third switch.

FIG. 1 is a schematic diagram of a charging circuit provided by the embodiments of the present disclosure.

As shown in FIG. 1, the charging circuit further includes a switch control circuit used by the charging management module to control the first switch, the second switch, and the third switch.

The switch control circuit connects with a gate of the first switch, a gate of the second switch, and a gate of the third switch; a drain of the first switch is connected with the first charging interface, a source of the first switch is connected with a source of the second switch, a drain of the second switch is connected with the second charging interface, a drain of the third switch is connected with the second charging interface.

In FIG. 1, switch A is the first switch, switch B is the second switch, switch C is the third switch and switch D is the fourth switch. The connection/disconnection of the first charging path 101, the second charging path 102 and the parallel charging path 103 can be controlled through turning on or turning off switch A, switch B and switch C. In other words, the first charging path may be connected or disconnecting by turning on or turning the corresponding switch in the first charging path. When the switch is turned on, the corresponding charging path is enabled. When the switch is turned off, the corresponding charging path is disabled.

The first switch, the second switch, and the third switch are NMOS switches. The charging management module is further configured to detect a charging type of charging mode of the electronic device and the temperature of the electronic device, control the first switch, the second switch, and the third switch, to disconnect the charging path operating in the wireless charging mode and the parallel charging path, in the first charging path and the second charging path, and connect the charging path operating in the wired charging mode when the temperature of the electronic device reaches a preset threshold. In this way, the electronic device is wired charged.

In addition, the charging circuit may further include an over protection circuit to prevent the voltage or the current from being too high, and a voltage reduction circuit controlled by a fourth switch. Of course, the charging circuit may further include other circuits or electric parts for implementing other functions. The present disclosure is not limited thereto.

Noticeably, the electronic device can be any device operating with electric energy, such as mobile phones, tablet computers, camera, etc. The specific electronic device is not limited in the presently disclosed embodiment.

Figure 2:
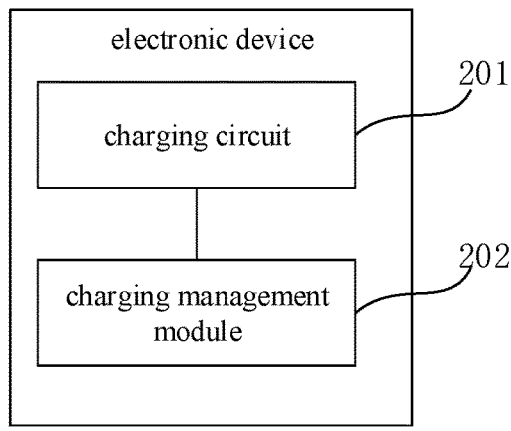
FIG. 2 is a schematic diagram of an electronic device provided by an aspect of the present disclosure.

FIG. 2 is a schematic diagram of an electronic device provided by an aspect of the present disclosure. As shown in FIG. 2, the electronic device further includes a charging circuit 201 and a charging management module 202.

Figure 3:
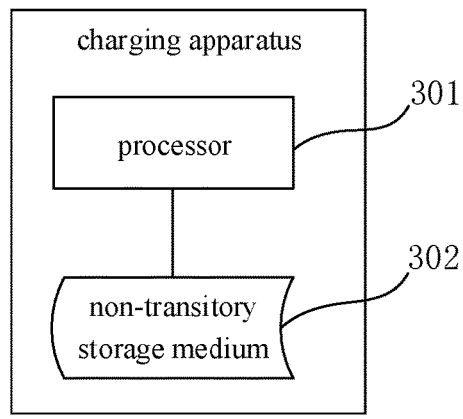
FIG. 3 is a schematic diagram of a charging apparatus provided by an aspect of the present disclosure.

FIG. 3 is a schematic diagram of a charging apparatus provided by an aspect of the present disclosure. As shown in FIG. 3, the charging apparatus further includes a processor 301 and a non-transitory storage medium 302 configured to store executable instructions executed by the processor.

Figure 4:
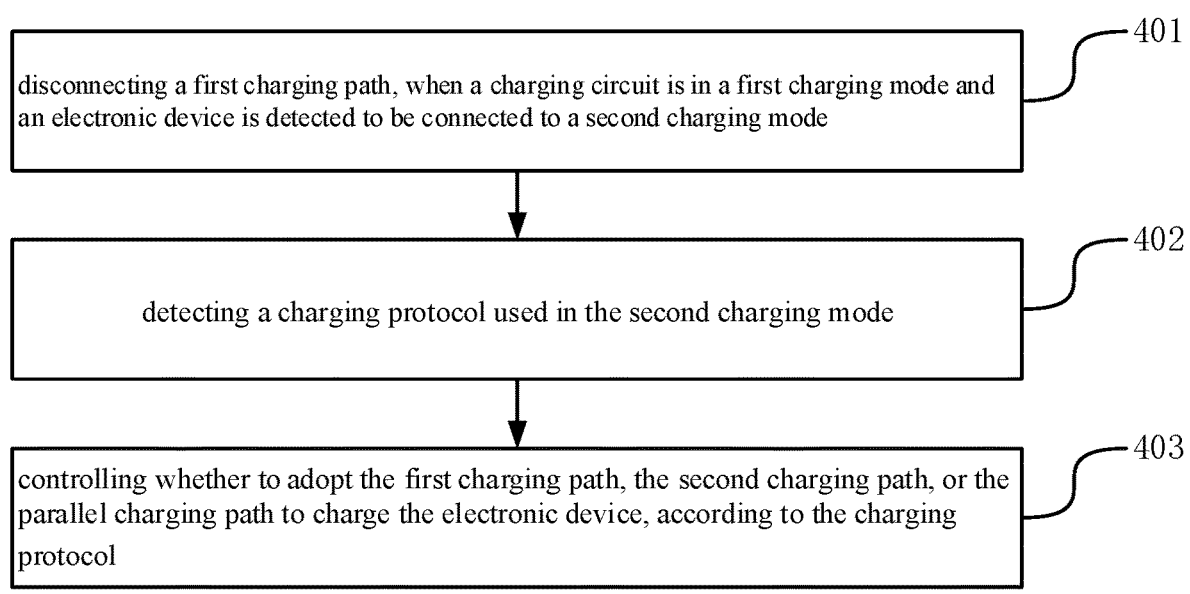
FIG. 4 is a flow diagram of a charging method provided by an aspect of the present disclosure.

FIG. 4 is a flow diagram of a charging method provided by the embodiments of the present disclosure. The method is executed by the charging management module of the electronic device. As shown in FIG. 1, the method includes:

At step 401, a first charging path is disconnected, when a charging circuit is in a first charging mode, and an electronic device is detected to be connected to a second charging mode.

At step 402, a charging protocol used in the second charging mode is obtained. For example, the electronic device may obtain the charging protocol used in the second charging mode by reading a communication log or a pre-stored table based on handshake information from a wireless charger.

At step 403, whether to adopt the first charging path, the second charging path, or the parallel charging path are controlled to charge the electronic device according to the charging protocol. For example, the electronic device may adopt the first charging path by turning on a switch connected to the first charging path. Similarly, the electronic device may adopt the second charging path by turning on a second switch connected to the second charging path.

With the method of the embodiments of the present disclosure, when the electronic device is in the second charging mode and the charging method suitable for the charging protocol for the second charging mode is detected, the connection/disconnection of the first charging path, the second charging path, and the parallel charging path can be controlled according to the charging protocol, so that different charging methods can be performed according to different charging protocols.

Here, controlling the connection/disconnection of the first charging path, the second charging path, and the parallel charging path to parallel charge the electronic device, when the charging protocol used in the second charging mode is a first type protocol.

When the first charging path is a wired charging path and the second charging path is a wireless charging path, the first charging mode is a wired charging mode, the second charging mode is a wireless charging mode, and the first type protocol includes Qi protocol and MAP protocol.

When the first charging path is a wireless charging path and the second charging path is a wired charging path, the first charging mode is a wireless charging mode, the second charging mode is a wired charging mode, and the first type protocol includes BC1.2 protocol.

In the present disclosure, the controlling the connection/disconnection of the first charging path, the second charging path, and the parallel charging path to parallel charge the electronic device includes: controlling the connection of the first charging path and the parallel charging path, and controlling the disconnection of the second charging path.

Alternatively or additionally, the controlling the connection/disconnection of the first charging path, the second charging path, and the parallel charging path to parallel charge the electronic device further includes: controlling charging current of the charging path operating in the wired charging mode, and controlling an absolute value of difference between the charging current of the charging path operating in the wired charging mode and charging current of the charging path operating in the wireless charging mode within a preset range.

Alternatively or additionally, the controlling the connection/disconnection of the first charging path, the second charging path, and the parallel charging path to charge the electronic device according to the charging protocol includes: when the charging protocol used in the second charging mode is a second type protocol which includes A4WP protocol, controlling the disconnection of the second charging path and the parallel charging path, controlling the connection of the first charging path, to perform wired charging on the electronic device.

Alternatively or additionally, the controlling the connection/disconnection of the first charging path, the second charging path, and the parallel charging path to charge the electronic device according to the charging protocol includes: when the charging protocol used in the second charging mode is a second type protocol which includes QC protocol and PD protocol, controlling the disconnection of the first charging path and the parallel charging path, controlling the connection of the second charging path, to perform wired charging on the electronic device.

Alternatively or additionally, the controlling the connection/disconnection of the first charging path, the second charging path, and the parallel charging path to parallel charge the electronic device further includes: determining whether a wired charging voltage and a wireless charging voltage match up during a parallel charging of the electronic device; when the wired charging voltage matches up with the wireless charging voltage, continuing the parallel charging; and when the wired charging voltage does not match up with the wireless charging voltage, controlling the disconnection of the charging path operating in the wireless charging mode and the parallel charging path, in the first charging path and the second charging path, controlling the connection of the charging path operating in the wired charging mode, to perform wired charging on the electronic device. For example, the electronic device may determine that the wired charging voltage and the wireless charging voltage match up when the difference between the two voltages is less than a predetermined threshold. For example, the predetermined threshold may be an absolute value between 0.2V and 1V. Alternatively, the predetermined threshold may be a percentage such as 10% or 15% of one of the charging voltages.

Alternatively or additionally, the controlling the connection/disconnection of the first charging path, the second charging path, and the parallel charging path to parallel charge the electronic device further includes: receiving first current detection information transmitted by a first charging device and second current detection information transmitted by a second charging device, wherein the first current detection information includes a current value of first current output to the electronic device by the first charging device, and the second current detection information includes a current value of second current output to the electronic device by the second charging device; and when product of the current value of first current and the current value of second current is less than 0, controlling the disconnection of the charging path operating in the wireless charging mode and the parallel charging path, in the first charging path and the second charging path, controlling the connection of the charging path operating in the wired charging mode, to perform the wired charging on the electronic device.

Alternatively or additionally, the controlling the connection/disconnection of the first charging path, the second charging path, and the parallel charging path to parallel charge the electronic device further includes: detecting temperature of the electronic device during parallel charging of the electronic device; when the temperature of the electronic device reaches a preset threshold, controlling the disconnection of the charging path operating in the wireless charging mode and the parallel charging path, in the first charging path and the second charging path, controlling the connection of the charging path operating in the wired charging mode, to perform the wired charging on the electronic device.

Additionally or alternatively, the electronic device may control whether to adopt the first charging path, the second charging path, or the parallel charging path according to the charging protocol and the temperature detected on the electronic device.

All of the selectable technique solutions described above, may be selected in any combination to form alternative embodiments of the present disclosure, and will not be described again herein.

Figure 5:
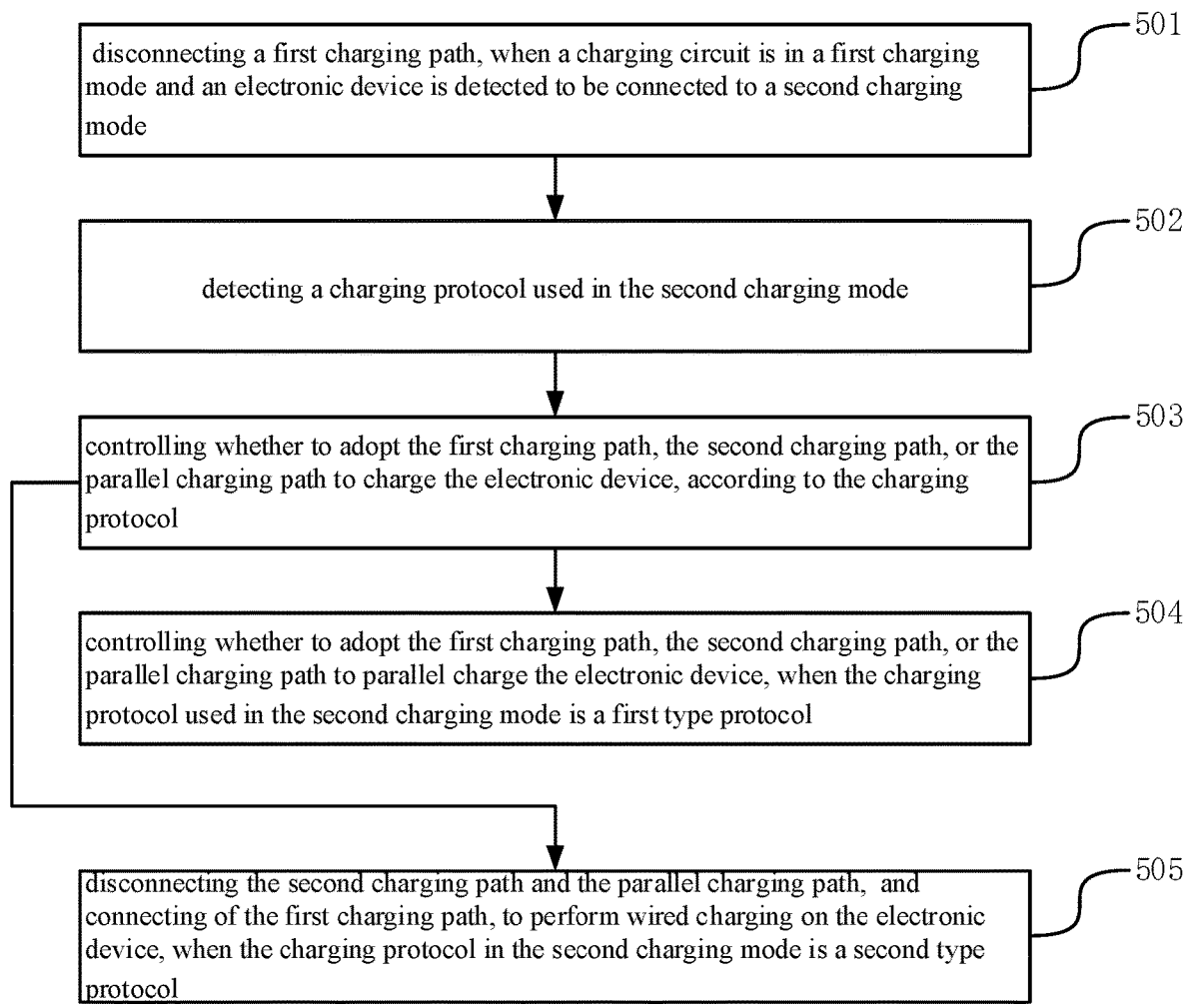
FIG. 5 is a flow diagram of a charging method provided by an aspect of the present disclosure.

FIG. 5 is a flow diagram of a charging method provided by the embodiments of the present disclosure. As shown in FIG. 5, the charging method is applied to an electronic device. The electronic device comprises a charging circuit including a first charging path operating in a first charging mode, a second charging path operating in a second charging mode, and a parallel charging path operating simultaneously in the first charging mode and the second charging mode. This is to say, the parallel charging path can operate in both the first charging mode and the second charging mode simultaneously to perform parallel charging. The method is executed by the charging management module of the electronic device. In the presently disclosed embodiment, the charging management module is a charging management chip used for managing the charging process of the electronic device to avoid abnormal charging.

At step 501, the first charging path is disconnected when the charging circuit is in the first charging mode and the electronic device is detected to be connected to the second charging mode.

There are two charging modes at present, i.e. wired charging and wireless charging. According to the current and voltage, wired charging can be subdivided into charging with BC (Battery Charging) 1.2 Protocol, DCP (Discovery and basic Configuration Protocol), QC (Quick Charge) Protocol, and PD (Power Delivery) Protocol, wherein the charging voltage with BC 1.2 Protocol is lower than that with QC Protocol or PD Protocol. The charging handshake protocol is finished through USB data cable Data+ and Data− signals or CC (Channel Configuration) signal. On the other hand, the wireless charging handshake protocol is usually finished through Bluetooth or the wireless charging can be implemented through the voltage feedback from the transmitting end of the charging device. The wireless charging protocol includes Qi Protocol (a wireless charging standard developed by the Wireless Power Consortium, the first standard organization in the world that advocates wireless charging technology, uses main trend electromagnetic today. It has two major features, compatibility and versatility), MAP (Manufacturing Automation Protocol) and A4W (Alliance for Wireless Power) Protocol.

The first charging mode and the second charging mode are two different charging modes. When the first charging mode is the wired charging mode, the second charging mode is the wireless charging mode and correspondingly the first charging path is the wired charging path; when the first charging mode is the wireless charging mode, the second charging mode is the wired charging mode. And correspondingly the first charging path is the wireless charging path.

In the present disclosure, when the charging circuit is in the first charging mode, if the electronic device is detected to be connected to the second charging mode, it indicates that the parallel charging is going to be performed. The parallel charging refers to that the electronic device is charged in both the first charging mode and second charging mode simultaneously. In order to prevent the electronic device from being uncharged or to avoid the battery of the electronic device being damaged due to the voltage difference or current difference between the two charging modes during the parallel charging, the first charging path must be disconnected before it is determined whether the battery can be parallel charged.

When the charging circuit is in the first charging mode, the method of determining whether the electronic device has been connected to the second charging mode can be: to determine whether the charging voltage or charging current is beyond the preset ranges. If the charging voltage or charging current has been detected beyond the preset ranges, it is determined that the electronic device has been connected to the second charging mode.

Here, the preset range is determined based on the charging voltage or the charging current in the second charging mode, or based on the charging voltage fluctuation or the charging current fluctuation in the first charging mode.

For example, since the charging voltage and the charging current in the wired charging mode are normally greater than those in the wireless charging mode, the preset range may be set as the minimum charging voltage or the minimum charging current in the second charging mode, when the first charging mode is a wireless charging mode and the second charging mode is a wired charging mode. When the charging voltage or the charging current of the charging circuit is greater than the minimum charging voltage or the minimum charging current in the second charging mode, it means that the charging voltage or charging current is beyond the preset range. Alternatively, the preset range may also be set as the maximum charging voltage after the charging voltage fluctuation occurs or as the maximum charging current after the charging current fluctuation occurs in the first charging mode. When the charging voltage or the charging current of the charging circuit after the fluctuation occurs is greater than the maximum charging voltage or the maximum charging current in the first charging mode, it means that the charging voltage or the charging current is beyond the preset range.

In the disclosure, the preset range can be set as the minimum charging voltage after the charging voltage fluctuation occurs or as the minimum charging current after the charging current fluctuation occurs in the first charging mode, when the first charging mode is a wired charging mode and the second charging mode is a wireless charging mode. When the charging voltage or the charging current of the charging circuit is lower than the minimum charging voltage or the minimum charging current, it means that the charging voltage or the charging current is beyond the preset range. Alternatively, the preset range can be set as the maximum charging voltage or the maximum charging current in the second charging mode. When the charging voltage or the charging current of the charging circuit is lower than the maximum charging voltage or the maximum charging current in the second charging mode, it means that the charging voltage or the charging current is beyond the preset range.

Of course, the preset range can also be set with other methods. The present disclosure is not limited thereto.

When the electronic device is charged in the first charging mode, the device is detected whether it is connected to the second charging mode to determine when to disconnect the first charging path in order to prevent the electronic device from being uncharged or to avoid any negative effect on the battery life, meanwhile guarantee the electronic device to be normally charged.

In some embodiments of the present disclosure, when the charging circuit is in the first charging mode, if the electronic device is detected to be connected to the second charging mode, the charging type for the first charging mode can be checked to determine whether the first charging mode is the wired charging mode or the wireless charging mode.

The method of detecting the charging type for the first charging mode may include following acts: detecting the current successful handshake protocol that has been saved in the charging management module; and obtaining the charging type for the first charging mode according to the charging protocol. For example, when the current successful handshake protocol saved in the charging management module is BC2.1 Protocol, QC2.0/3.0 Protocol, or PD Protocol, the charging type for the first charging mode can be determined to be the wired charging; when the current successful handshake protocol saved in the charging management module is Qi Protocol or MAP Protocol, the charging type for the first charging mode can be determined to be the wireless charging;

When the charging circuit is in the first charging mode without any other charging modes involved, the electronic device can continuously be charged in the first charging mode.

At step 502, the charging protocol used in the second charging mode is detected.

When it is detected that the electronic device is connected to the second charging mode, that is to say, when the second charging interface starts to supply the charging voltage or the charging current, according to the charging type for the second charging mode, the charging management module sends the multiple charging protocols corresponding to the charging type to the charging device and provides the charging device with the charging protocols. The charging protocol selected by the charging device will be sent to the charging management module. The process of negotiating the charging protocol between the charging management module and the charging device is a handshake. Once the charging protocol is selected after a successful handshake, the charging management module saves the selected charging protocol as the successful handshake protocol for the second charging mode.

In the embodiment of the present disclosure, the method of detecting the charging type for the second charging mode may include: obtaining the current successful handshake protocol that has been saved in the battery charging management module, where the successful handshake protocol corresponds to the second charging mode; and determining the successful handshake protocol to be the charging protocol used in the second charging mode.

The charging voltage varies in accordance with different charging protocols. Through detecting the charging protocol used in the second charging mode, the charging voltage of the second charging mode can be determined and it can further be determined whether the charging voltage matches up with the charging voltage of the first charging mode. If it does, the parallel charging can be applied; if not, the parallel charging cannot be applied in order to prevent the battery of the electronic device from being uncharged or being damaged with the parallel charging directly. Here, the charging voltage of the second charging mode matching up with the charging voltage of the first charging mode means that the voltage difference between the charging voltage of the second charging mode and the charging voltage of the first charging mode is little, and big voltage difference or current difference which leads to abnormal charging can be avoided during parallel charging.

At step 503, the connection/disconnection of the first charging path, the second charging path and the parallel charging path can be controlled to charge the electronic device according to the charging protocol. When the charging protocol applied in the second charging mode is a first type charging protocol, step 504 is executed; when the charging protocol applied in the second charging mode is a second type protocol, step 505 is executed.

When the electronic device is connected to the second charging mode and charging method to which the charging protocol for the second charging mode matches up is detected, the charging method can be dynamically selected to perform the charging through controlling the connection/disconnection of the first charging path, the second charging path, and the parallel charging path according to the charging protocol.

At step 504, when the charging protocol applied in the second charging mode is the first type protocol, the connection/disconnection of the first charging path, the second charging path, and the parallel charging path can be controlled to parallel charge the electronic device.

Here, the first type protocol is suitable for parallel charging. The charging voltage and the charging current corresponding to the first type protocol applied in the second charging mode match up with the charging voltage and the charging current in the first charging mode. Under this circumstance, at the same time the second charging mode is applied, the first charging mode can be applied to perform parallel charging.

When the charging protocol applied in the second charging mode is the first type protocol, controlling the connection/disconnection of the first charging path, the second charging path, and the parallel charging path means controlling the connection of the first charging path and the parallel charging path, and controlling the disconnection of the second charging path to perform parallel charging. That is to say, the protocols included in the first type protocol are different and the actual method of controlling the first charging path, the second charging path, and the parallel charging path is taken differently according to the difference between the first charging mode and second charging mode. The two scenarios are explained in detail hereafter.

In the first scenario, when the first charging path is the wired charging path and the second charging path is the wireless charging path, the first charging mode is the wired charging mode and the second charging mode is the wireless charging mode. The first type protocol includes Qi Protocol and MAP Protocol in the wireless charging mode.

In this case, as the charging circuit shown in FIG. 1, the charging management module sends a control instruction to the switch control circuit. The control instruction instructs the switch control circuit to turn on the first switch and the second switch in the charging circuit simultaneously in order to connect the wired charging path and the parallel charging path. The instruction also instructs the switch control circuit to turn off the third switch in order to disconnect the wireless charging path and to perform the parallel charging when the wired charging path and the parallel charging path operate simultaneously.

In the second scenario, when the first charging path is the wireless charging path and the second charging path is the wired charging path, the first charging mode is the wireless charging mode and the second charging mode is the wired charging mode. The first type protocol includes BC1.2 Protocol in the wired charging mode.

In this case, as the charging circuit shown in FIG. 1, the charging management module sends a control instruction to the switch control circuit. The instruction instructs the switch control circuit to turn on the first switch and the second switch in the charging circuit simultaneously in order to connect the wireless charging path and the parallel charging path. The instruction also instructs the switch control circuit to turn off the third switch in order to disconnect the wired charging path and to perform the parallel charging when the wired charging path and the parallel charging path operate simultaneously.

As shown in FIG. 1 when the charging circuit is being parallel charged, the charging path includes a first charging path where the first switch is located and the parallel charging path where the second switch is located. It is required to control the first switch and the second switch simultaneously in order to prevent initial parallel charging from reverse flow to achieve the connection and disconnection of the first charging path and parallel charging path simultaneously.

Here, the reverse flow refers to the current in a charging path flowing in a reverse direction in a second charging path. As shown in FIG. 1, when the current amount in the first charging path is greater than the current amount in the parallel charging path and when the current in the first charging path flows through the source of the first switch and the source of the second switch to the parallel charging path, the current flows in a reserve direction against the original charging current flow direction in the parallel charging path which stops parallel charging from be being executed normally or causes negative effects on the battery life.

Through applying the first type protocol in the second charging mode and controlling the first charging path, the second charging path, and the parallel charging path, the electronic device can be wired and wireless charged simultaneously not only to speed up the charging but also to avoid abnormal charging or battery damage because of the charging voltage or charging current mismatch during the parallel charging.

In some embodiments, after controlling the connection of the first charging path operating and the parallel charging path, and controlling the disconnection of the second charging path, the charging circuit can be controlled or detected in order to guarantee the parallel charging to be performed smoothly. Two methods are explained in detail hereafter:

In the first method, the charging current can be detected to adjust the charging mode. Specifically, in the process of parallel charging the electronic device, determining whether the wired charging voltage matches up with the wireless charging voltage; when the wired charging voltage matches up with the wireless charging voltage, continuing parallel charging; when the wired charging voltage does not match up with the wireless charging voltage, controlling the disconnection of the charging path operating in the wireless charging mode and the parallel charging path, and controlling the connection of the charging path operating in the wired charging mode to perform wired charging on the electronic device.

Here, the method of determining whether the wired charging voltage matches up with the wireless charging voltage can be: to detect the maximum voltage difference between the wired charging voltage and the wireless charging voltage within a preset time. If the maximum voltage difference is lower than the preset threshold, it is confirmed that wired charging voltage and the wireless charging voltage are matching; if the maximum voltage difference is not lower than the preset threshold, it is confirmed that wired charging voltage and the wireless charging voltage are not matching. In the present disclosure, how the preset time is set, how the preset threshold value is set, and what threshold value is are not limited.

In the process of performing parallel charging on the electronic device, whether the wired charging voltage matches up with the wireless charging voltage is detected. Switching to the wired charging when the wired charging voltage does not match up with the wireless charging voltage can further guarantee the parallel charging to be performed smoothly and avoid relative big voltage or current difference which leads to abnormal charging or has negative effects on the battery life. Further, the wired charging voltage or charging current is greater than the wireless charging voltage or charging current. Performing the wired charging when parallel charging is not suitable can maximize the charging speed and to optimize the charging performance.

In the second method, in order to avoid reverse flow, the charging current can also be controlled in the process of performing parallel charging on the electronic device. In detail, since the charging voltage in the wired charging mode is greater than the charging voltage in the wireless charging mode, current normally flows from the charging path operating in the wired charging mode to the charging path operating in the wireless charging mode when reverse flow occurs. Therefore, in the first charging path and the parallel charging path, through controlling the charging current of the charging path in the wired charging mode, the absolute value of difference between the charging current of the charging path in the wired charging mode and the charging current of the charging path in the wireless charging mode can be controlled within the preset range. In the present disclosure, what the range is or how the range is set is not limited.

In detail, when the first charging mode is the wired charging mode and the second charging mode is the wireless charging mode, after controlling the connection of the first charging path and the parallel charging path, and controlling the disconnection of the second charging path, the wired charging current of the first charging path needs to be limited in order to prevent the wired charging current which has existed before the wireless charging mode is involved from flowing in the reverse direction into the paralleling charging path. For example, the charging voltage supplied by the first charging interface can be decreased to reduce the wired charging current of the first charging path.

Likewise, when the first charging mode is the wireless charging mode and the second charging mode is the wired charging mode, after the first switch and second switch are turned on, the wired charging current of the second charging path needs to be limited. For example, the charging voltage supplied by the second charging interface can be decreased to reduce the wired charging current of the second charging path.

Through limiting the charging current when the parallel charging starts, the current reverse flow can be avoided to guarantee the parallel charging to run smoothly and to be optimized.

In one or more embodiments of the present disclosure, because there is a little difference between the charging voltage in the first charging mode and charging voltage in the second charging mode, in order to avoid the abnormal charging due to the little difference, the output current amount needs to be measured with a first charging device and a second charging device respectively and periodically and the result will be sent to the charging management module periodically so that the charging management module is able to adjust the charging mode timely according to the output current value, to guarantee the charging to run smoothly. The detailed method can be:

The charging management module receive first current detection information transmitted by a first charging device and second current detection information transmitted by a second charging device, wherein the first current detection information includes a current value of first current output to the electronic device by the first charging device, and the second current detection information includes a current value of second current output to the electronic device by the second charging device; when product of the current value of first current and the current value of second current is less than 0, controlling the disconnection of the charging path operating in the wireless charging mode and the parallel charging path, in the first charging path and the second charging path, controlling the connection of the charging path operating in the wired charging mode, to perform the wired charging on the electronic device. Or, when the time that the product of the current value of the first current and the current value of the second current is less than 0 and is greater than the preset number of times, controlling the disconnection of the charging path operating in the wireless charging mode and the parallel charging path, in the first charging path and the second charging path, controlling the connection of the charging path operating in the wired charging mode, to perform the wired charging on the electronic device.

Noticeably, the first charging device is the device connected to and supplying charging voltage to the first charging interface. The second charging device is the device connected to and supplying charging voltage to the second charging interface. When the first charging mode is the wireless charging mode and the second charging mode is the wired charging mode, the first charging device is the wireless charging device and the second charging device is the wired charging device; when the first charging mode is wired charging mode and the second charging mode is wireless charging mode, the first charging device is the wired charging device and the second charging device is the wireless charging device.

Here, when the product of the current value of first electric current and the current value of second electric current is less than 0, it means the reverse flow happens during the parallel charging. That is to say, the current in one charging path flows on another charging path in a reverse direction against the flow direction of the original current in that path. In this case, the charging management module needs to control the first charging path, the second charging path, and the parallel charging path to stop the parallel charging and turn to wired charging.

Through detecting the charging current periodically during the parallel charging, the parallel charging can be stopped timely when the reverse flow occurs so that the long time reverse flow which causes abnormal charging and has a negative effect on the battery life can be avoided and the charging performance can be optimized as well. Also, compared with wireless charging, the charging is faster and charging performance is higher during wired charging.

In a further embodiment of the present disclosure, because the current flowing in the charging path can raise temperature of the electronic device, during the parallel charging, it is necessary to check the temperature of the electronic device to prevent the electronic device from being damaged and reduce the negative effect on the electronic device to the minimum due to the high temperature. The detail method can be:

The temperature of the electronic device can be detected during the parallel charging is performed. When the temperature of the electronic device reaches a preset threshold, the electronic device may disconnect of the charging path operating in the wireless charging mode and the parallel charging path, in the first charging path and the second charging path. The electronic device may connect of the charging path operating in the wired charging path to perform wired charging on the electronic device. The present disclosure does not limit how the preset threshold is set and what the preset threshold is.

Through adding the functionality of temperature protection to the electronic device, the negative effect on the electronic device can be avoided when the electronic device is parallel charged due to the rising temperature. Meanwhile, the charging mode can be switched to the wired charging mode automatically before the temperature rises too high in order to further optimize the charging method.

At step 505, when the charging protocol in the second charging mode is the second type protocol, the disconnection of the charging path operating in the wireless charging mode and the parallel charging path, in the first charging path and the second charging path, will be controlled and the connection of the charging path operating in the wired charging mode will be controlled so that the electronic device can be wired charged.

Here, the second type protocol is not suitable for parallel charging. Because the charging voltage and the charging current corresponding to the second type protocol used in the second charging mode don't match up with the charging voltage and the charging current in the first charging mode or the second type protocol applied in the second charging mode causes the temperature to rise too fast during the charging, meanwhile if other charging modes are added for the parallel charging, the temperature rises even faster, which can damage the electronic device or the charging device. Compared with wireless charging mode, wired charging mode is relatively stable and the charging speed is relatively fast, in this case charging the electronic device in the wired charging mode becomes the preferred option.

According to different charging types in the second charging mode, the protocols included in the second type protocol may vary. Two scenarios are described hereafter.

In the first scenario, when the second charging mode is the wired charging mode, the second type protocol includes QC Protocol and PD Protocol.

Because the charging voltage for the wired charging protocol QC Protocol and PD Protocol is higher than the wireless charging voltage, when the protocol for the second charging mode is QC Protocol or PD Protocol, and the first charging mode is the wireless charging mode, the current inverse flow will occur and the charging won't run normally when parallel charging is performed under this circumstance. Therefore, in order to guarantee to charge successfully, when protocol applied in the second charging mode is QC Protocol or PD Protocol, the electronic device will be wired charged by controlling the first charging path, the second charging path, and the parallel charging path. That is to say, the disconnection of the first charging path and the parallel charging path, and the connection of the second charging path will be controlled to perform the wired charge on the electronic device.

In the second scenario, when the second charging mode is the wireless charging mode, the second type protocol include A4WP Protocol.

Because the wireless charging range for the wireless charging protocol A4WP is relatively wide and the temperature will rise relatively high during the wireless charging, when the charging protocol in the second charging mode is A4WP and the first charging mode is wired charging mode, the temperature will rise higher if the parallel charging is performed under this circumstance, which can damage the electronic device or the charging device. Therefore, to prevent the electronic device or the charging device from being damaged, it is necessary to control the first charging path, the second charging path, and the parallel charging path to perform wired charging on the electronic device when the charging protocol in the second charging mode is A4WP. That is to say, the disconnection of the second charging path and the parallel charging path, and the connection of the first charging path will be controlled to perform the wired charge on the electronic device.

When the charging protocol in the second charging mode is identified as unsuitable for parallel charging, selecting wired charging on the electronic device can avoid abnormal charging or negative effects on the battery life if parallel charging is forced to be applied.

Figure 6:
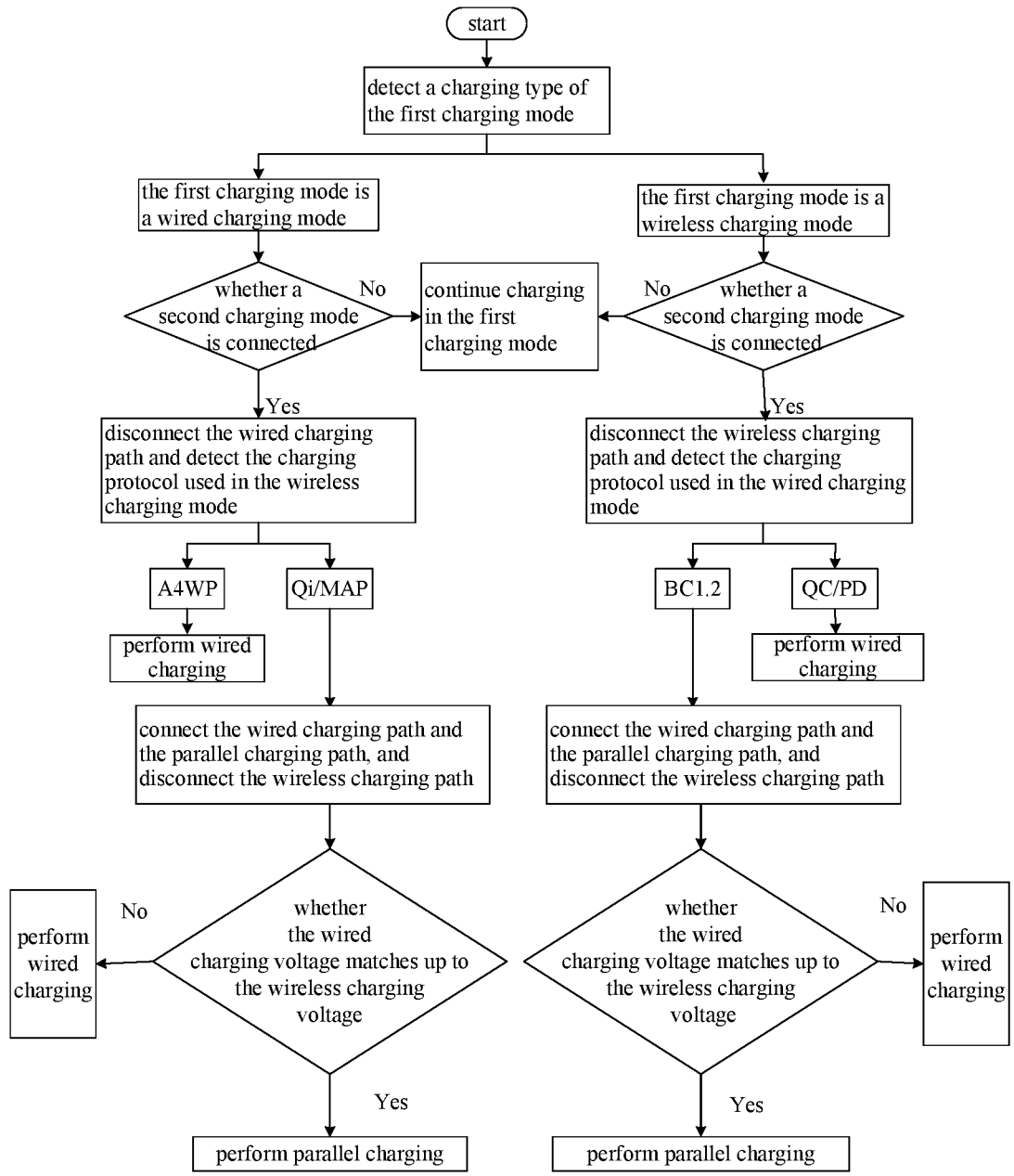
FIG. 6 is a flow diagram of a charging method provided by an aspect of the present disclosure.

The charging method in the embodiment of the present disclosure, in reality, can be practiced as shown in FIG. 6. Once it is detected that the electronic device has been connected to the second charging mode, the charging type in the first charging mode will be detected. According to the different charging types in the first charging mode, as shown in FIG. 6, two execution branches will execute its corresponding operation respectively.

For the first execution branch, when the first charging mode is the wired charging mode, if no wireless charging mode is connected, the electronic device is kept being charged in the first charging mode; if the wireless charging mode is connected, the wired charging path will be disconnected and the protocol applied in the wireless charging mode will be detected. When the charging protocol in the wireless charging mode is identified as A4WP, the wireless charging path will be disconnected and the wired charging path will be connected to charge the electronic device. When the charging protocol in the wireless charging mode is identified Qi Protocol or MAP Protocol, the wired charging path and the parallel charging path will be connected and it will be detected whether wired charging voltage matches up with the wireless charging voltage; if it does, the parallel charging will be performed; otherwise the parallel charging path will be disconnected and the wired charging will be performed.

For the second execution branch, when the first charging mode is the wireless charging mode, if no wired charging is connected, the electronic device is kept being charged in the first charging mode; if the wired charging is connected, the wireless charging path will be disconnected and the protocol applied in the wired charging mode will be detected. When the charging protocol in the wired charging mode is identified as QC Protocol or PD Protocol, the wired charging path will be connected to charge the electronic device. When the charging protocol in the wired charging mode is identified as BC1.2 Protocol, the wireless charging path and the parallel charging path will be connected, the wired charging path will be disconnected and it will be detected whether wired charging voltage matches up with the wireless charging voltage; if it does, the parallel charging will be performed; otherwise the wireless charging path and the parallel charging path will be disconnected, the wired charging path will be connected and the wired charging will be performed.

In the embodiment of the present disclosure, when the electronic device is in the second charging mode and the charging protocol for the second charging mode is detected suitable for the parallel charging, the first charging path, the second charging path, and the parallel charging path can be controlled to perform parallel charging so that not only the charging speed can be increased but also the abnormal charging or negative effect on battery life can be avoided. Through adding the functionality of temperature protection, during performing parallel charging on the electronic device, the negative effects on the electronic device due to the rising temperature in the device can be avoided. In addition, it will guarantee to automatically switch the parallel charging mode to wired charging mode before the temperature rises too high so that the charging performance can be further optimized.

The beneficial effects of the technical solutions of the embodiments of the present invention are: when the electronic device is connected to the second charging mode and charging method to which the charging protocol for the second charging mode matches up is detected, the charging method can be dynamically selected to perform the charging according to different charging protocols through controlling the connection/disconnection of the first charging path, the second charging path, and the parallel charging path.

In the present disclosure, controlling the connection/disconnection of the first charging path, the second charging path, and the parallel charging path to parallel charge the electronic device, when the charging protocol used in the second charging mode is a first type protocol.

The first charging path, the second charging path, and the parallel charging path can be controlled to perform parallel charging so that not only the charging speed can be increased but also the abnormal charging or negative effect on battery life can be avoided.

Here, when the first charging path is a wired charging path and the second charging path is a wireless charging path, the first charging mode is a wired charging mode, the second charging mode is a wireless charging mode, and the first type protocol includes Qi protocol and MAP protocol.

The Qi protocol and MAP protocol used in the wireless charging mode represent that parallel charging can be performed when the charging voltage and the charging current corresponding to the wireless charging mode match up with the charging voltage and the charging current in the wired charging mode, so that the abnormal charging or negative effect on battery life can be avoided.

Here, when the first charging path is a wireless charging path and the second charging path is a wired charging path, the first charging mode is a wireless charging mode, the second charging mode is a wired charging mode, and the first type protocol includes BC1.2 protocol.

The BC1.2 protocol used in the wired charging mode represents that parallel charging can be performed when the charging voltage and the charging current corresponding to the wired charging mode match up with the charging voltage and the charging current in the wireless charging mode, so that the abnormal charging or negative effect on battery life can be avoided.

In the present disclosure, the controlling the connection/disconnection of the first charging path, the second charging path, and the parallel charging path to parallel charge the electronic device includes: controlling the connection of the first charging path and the parallel charging path, and controlling the disconnection of the second charging path.

Parallel charging can be performed by way of controlling wired charging path, wireless charging path and parallel charging path to increase the switching speed among different charging modes and the charging speed.

In the present disclosure, the controlling the connection/disconnection of the first charging path, the second charging path, and the parallel charging path to parallel charge the electronic device further includes: controlling charging current of the charging path operating in the wired charging mode, and controlling an absolute value of difference between the charging current of the charging path operating in the wired charging mode and charging current of the charging path operating in the wireless charging mode within a preset range.

Through limiting the charging current when the parallel charging starts, the current reverse flow can be avoided to guarantee the parallel charging to run smoothly and to be optimized.

In the present disclosure, the controlling the connection/disconnection of the first charging path, the second charging path, and the parallel charging path to charge the electronic device according to the charging protocol includes: when the charging protocol used in the second charging mode is a second type protocol which includes A4WP protocol, controlling the disconnection of the second charging path and the parallel charging path, and controlling the connection of the first charging path, to perform wired charging on the electronic device.

Because the wireless charging range for the wireless charging protocol A4WP is relatively wide and the temperature will rise relatively high during the wireless charging, when the charging protocol in the second charging mode is A4WP protocol and the first charging mode is wired charging mode, the temperature will rise higher during the parallel charging which can damage the electronic device or the charging device. Therefore, to prevent the electronic device or the charging device from being damaged, it is necessary to control the first charging path, the second charging path, and the parallel charging path to perform wired charging on the electronic device when the charging protocol in the second charging mode is A4WP protocol.

Here, the controlling the connection/disconnection of the first charging path, the second charging path, and the parallel charging path to charge the electronic device according to the charging protocol further includes: when the charging protocol used in the second charging mode is a second type protocol which includes QC protocol and PD protocol, control the disconnection of the first charging path and the parallel charging path, controlling the connection of the second charging path, to perform wired charging on the electronic device.

Because the charging voltage for the wired charging protocol QC protocol and PD protocol is higher than the wireless charging voltage, when the protocol for the second charging mode is QC protocol or PD protocol, and the first charging mode is the wireless charging mode, the current inverse flow will occur and the charging won't run normally when parallel charging is performed under this circumstance. Therefore, in order to guarantee to charge smoothly, wired charging can be performed on the electronic device by controlling the first charging path, the second charging path, and the parallel charging path, when the protocol applied in the second charging mode is QC protocol or PD protocol.

Alternatively or additionally, the controlling the connection/disconnection of the first charging path, the second charging path, and the parallel charging path to parallel charge the electronic device further includes: determining whether a wired charging voltage and a wireless charging voltage match up during a parallel charging of the electronic device; when the wired charging voltage matches up with the wireless charging voltage, continuing the parallel charging; and when the wired charging voltage does not match up with the wireless charging voltage, controlling the disconnection of the charging path operating in the wireless charging mode and the parallel charging path, in the first charging path and the second charging path, controlling the connection of the charging path operating in the wired charging mode, to perform wired charging on the electronic device.

In the process of parallel charging the electronic device, determining whether the wired charging voltage matches up with the wireless charging voltage can further guarantee the parallel charging to be performed smoothly and avoid relative big voltage or current difference which leads to abnormal charging or has negative effects on the battery life.

Alternatively or additionally, the controlling the connection/disconnection of the first charging path, the second charging path, and the parallel charging path to parallel charge the electronic device further includes: receiving first current detection information transmitted by a first charging device and second current detection information transmitted by a second charging device, wherein the first current detection information includes a current value of first current output to the electronic device by the first charging device, and the second current detection information includes a current value of second current output to the electronic device by the second charging device; and when product of the current value of first current and the current value of second current is less than 0, controlling the disconnection of the charging path operating in the wireless charging mode and the parallel charging path, in the first charging path and the second charging path, controlling the connection of the charging path operating in the wired charging mode, to perform the wired charging on the electronic device.

Through detecting the charging current periodically during the parallel charging, the parallel charging can be stopped timely when reverse flow occurs so that the long time reverse flow which causes abnormal charging and has a negative effect on the battery life can be avoided and the charging performance can be optimized as well.

Alternatively or additionally, the controlling the connection/disconnection of the first charging path, the second charging path, and the parallel charging path to parallel charge the electronic device further includes: detecting temperature of the electronic device during parallel charging of the electronic device; when the temperature of the electronic device reaches a preset threshold, controlling the disconnection of the charging path operating in the wireless charging mode and the parallel charging path, in the first charging path and the second charging path, controlling the connection of the charging path operating in the wired charging mode, to perform the wired charging on the electronic device.

Through adding the functionality of temperature protection to the electronic device, the negative effect on the electronic device due to the rising temperature can be avoided when parallel charging is performed. Meanwhile, the charging mode can be switched to the wired charging mode automatically before the temperature rises too high during parallel charging in order to further optimize the charging method.

Here, when the charging protocol used in the second charging mode is a first type protocol, the charging management module controls the first switch and the second switch to be turned on and the third switch to be turned off to parallel charge the electronic device.

Alternatively or additionally, the charging circuit further includes a switch control circuit used by the charging management module to control the first switch, the second switch, and the third switch.

The charging management module can control the charging paths through the switch control circuit to further improve the switching flexibility among different charging modes.

In the present disclosure, the switch control circuit connects with a gate of the first switch, a gate of the second switch, and a gate of the third switch; and a drain of the first switch is connected with the first charging interface, a source of the first switch is connected with a source of the second switch, a drain of the second switch is connected with the second charging interface, a drain of the third switch is connected with the second charging interface.

Here, the first switch, the second switch, and the third switch are NMOS (N-Metal Oxide Semiconductor Field Effect Transistor) switches. Control sensitivity and circuit stability can be improved by using NMOS switches as the first switch, the second switch and the third switch.

In the present disclosure, the charging management module is further configured to detect a charging type of charging mode of the electronic device.

The charging type can be adjusted according to the charging mode by detecting a charging type of charging mode of the electronic device, to further optimize the charging performance.

In the present disclosure, the charging management module is further configured to detect temperature of the electronic device. The charging mode can be switched based on temperature as detected to prevent the electronic device or the charging device from being damaged due to high temperature.

In the present disclosure, the charging management module is further configured to, when the temperature of the electronic device reaches a preset threshold, control the first switch, the second switch, and the third switch, to disconnect the charging path operating in the wireless charging mode and the parallel charging path, in the first charging path and the second charging path, and connect the charging path operating the wired charging mode.

Through adding the functionality of temperature protection to the electronic device, the negative effect on the electronic device due to the rising temperature can be avoided when parallel charging is performed. Meanwhile, the charging mode can be switched to the wired charging mode automatically before the temperature rises too high during parallel charging in order to further optimize the charging method.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Persons of ordinary skill in the art can understand that all or part of the steps described in the above embodiments can be completed through hardware, or through relevant software instructed by application stored in a non-transitory computer readable storage medium, such as read-only memory, disk or CD, etc.

Embodiments described above as just preferred embodiments of the present disclosure and the present disclosure is not limited thereto. All modifications, equivalent replacements and improvements without departing from the spirit and principles thereof belong to a protection scope of the present disclosure.

What is claimed is:

1. A method for charging an electronic device, comprising:
    disconnecting a first charging path, when a charging circuit is in a first charging mode and the electronic device is detected to be connected to a second charging mode, wherein the electronic device comprises the charging circuit including the first charging path comprising a first switch operating in the first charging mode, a second charging path comprising a third switch operating in a second charging mode, and a parallel charging path comprising a second switch operating simultaneously in the first charging mode and the second charging mode;
    controlling the parallel charging path through the first switch and the second switch;
    controlling the second charging path through the third switch;
    obtaining a charging protocol corresponding to a charging type used in the second charging mode; and
    determining whether to adopt the first charging path, the second charging path, or the parallel charging path to charge the electronic device, according to the charging protocol.

2. The method of claim 1, wherein determining whether to adopt the first charging path, the second charging path, or the parallel charging path to charge the electronic device according to the charging protocol comprises:
    controlling whether to connect or disconnect one of the first charging path, the second charging path, and the parallel charging path to parallel charge the electronic device, when the charging protocol used in the second charging mode is a first type protocol.

3. The method of claim 2, further comprising:
    when the first charging path is a wired charging path and the second charging path is a wireless charging path, the first charging mode is a wired charging mode, the second charging mode is a wireless charging mode, and the first type protocol includes wireless charging Qi protocol and manufacturing automation protocol (MAP).

4. The method of claim 2, further comprising:
    when the first charging path is a wireless charging path and the second charging path is a wired charging path, the first charging mode is a wireless charging mode, the second charging mode is a wired charging mode, and the first type protocol includes battery charging BC1.2 protocol.

5. The method of claim 2, wherein determining whether to adopt the first charging path, the second charging path, or the parallel charging path to parallel charge the electronic device comprises:
    adopting the first charging path and the parallel charging path by connecting corresponding switches in the first charging path and the second charging path, and disabling the second charging path by disconnecting a corresponding switch in the second charging path.

6. The method of claim 2, wherein controlling whether to adopt the first charging path, the second charging path, or the parallel charging path to parallel charge the electronic device further comprises:
    controlling charging current of the charging path operating in a wired charging mode, to ensure an absolute value of difference between the charging current of the charging path operating in the wired charging mode and charging current of the charging path operating in a wireless charging mode within a preset range.

7. The method of claim 2, wherein controlling whether to adopt the first charging path, the second charging path, or the parallel charging path to parallel charge the electronic device further comprises:
    receiving first current detection information transmitted by a first charging device and second current detection information transmitted by a second charging device, wherein the first current detection information includes a current value of first current output to the electronic device by the first charging device, and the second current detection information includes a current value of second current output to the electronic device by the second charging device; and
    disconnecting the charging path operating in a wireless charging mode and the parallel charging path, in the first charging path and the second charging path, connecting the charging path operating in a wired charging mode, to perform wired charging on the electronic device, when product of the current value of first current and the current value of second current is less than 0.

8. The method of claim 2, wherein controlling whether to adopt the first charging path, the second charging path, or the parallel charging path to parallel charge the electronic device further comprises:
   detecting temperature of the electronic device during parallel charging of the electronic device;
   disconnecting the charging path operating in a wireless charging mode and the parallel charging path, in the first charging path and the second charging path, and connecting the charging path operating in a wired charging mode, to perform wired charging on the electronic device, when the temperature of the electronic device reaches a preset threshold.

9. The method of claim 1, wherein controlling whether to adopt the first charging path, the second charging path, or the parallel charging path to charge the electronic device according to the charging protocol comprises:
   disconnecting the second charging path and the parallel charging path, and connecting the first charging path, to perform wired charging on the electronic device, when the charging protocol used in the second charging mode is a second type protocol, and the second type protocol includes wireless charging standard alliance A4WP protocol.

10. The method of claim 1, wherein controlling whether to adopt the first charging path, the second charging path, or the parallel charging path to charge the electronic device according to the charging protocol comprises:
    disconnecting the first charging path and the parallel charging path, and connecting the second charging path, to perform wired charging on the electronic device, when the charging protocol used in the second charging mode is a second type protocol, and the second type protocol includes quick charging QC protocol and power delivery PD protocol.

11. The method of claim 2, wherein controlling whether to adopt the first charging path, the second charging path, or the parallel charging path to parallel charge the electronic device further comprises:
    determining whether a wired charging voltage and a wireless charging voltage match up during a parallel charging of the electronic device;
    continuing the parallel charging, when the wired charging voltage matches up with the wireless charging voltage; and
    disconnecting the charging path operating in the wireless charging mode and the parallel charging path, in the first charging path and the second charging path, and connecting the charging path operating in the wired charging mode, to perform wired charging on the electronic device, when the wired charging voltage does not match up with the wireless charging voltage.

12. An electronic device, comprising:
    a charging management module and a charging circuit, wherein
    the charging circuit includes a first charging path, a second charging path, and a parallel charging path;
    the first charging path includes a first switch and a first charging interface, the first switch is connected with the first charging interface in the first charging path;
    the parallel charging path includes a second switch and a second charging interface, the second switch is connected with the second charging interface in the parallel charging path, and the second switch is connected with the first switch in the first charging path;
    the second charging path includes a third switch and the second charging interface, the third switch is connected with the second charging interface in the second charging path; and
    the charging management module is configured to
    control the first charging path through the first switch,
    control the parallel charging path through the first switch and the second switch,
    control the second charging path through the third switch;
    disconnect the first charging path, when the charging circuit is in a first charging mode and the electronic device is detected to be connected to a second charging mode;
    obtain a charging protocol corresponding to a charging type used in the second charging mode; and
    determine whether to adopt the first charging path, the second charging path, or the parallel charging path to charge the electronic device, according to the charging protocol.

13. The electronic device of claim 12, wherein the charging management module turns on the first switch and the second switch and turns off the third switch to parallel charge the electronic device, when the charging protocol used in a second charging mode is a first type protocol.

14. The electronic device of claim 12 wherein the charging circuit further includes a switch control circuit used by the charging management module to control the first switch, the second switch, and the third switch.

15. The electronic device of claim 14, wherein the switch control circuit connects with a gate of the first switch, a gate of the second switch, and a gate of the third switch; and
    a drain of the first switch is connected with the first charging interface, a source of the first switch is connected with a source of the second switch, a drain of the second switch is connected with the second charging interface, a drain of the third switch is connected with the second charging interface.

16. The electronic device of claim 12, wherein the first switch, the second switch, and the third switch are N-type metal oxide semiconductor field effect transistor NMOS switches.

17. The electronic device of claim 12, wherein the charging management module is further configured to detect the charging type of the charging mode of the electronic device.

18. The electronic device of claim 12, wherein the charging management module is further configured to detect temperature of the electronic device.

19. The electronic device of claim 18, wherein the charging management module is further configured to, when the temperature of the electronic device reaches a preset threshold, control the first switch, the second switch, and the third switch, to disconnect the charging path operating in a wireless charging mode and the parallel charging path, in the first charging path and the second charging path, and to connect the charging path operating in a wired charging mode.

20. A charging apparatus, comprising:
    a processor; and
    a non-transitory storage medium configured to store executable instructions executed by the processor;
    wherein the processor is configured to:

disconnect a first charging path comprising a first switch, when a charging circuit is in a first charging mode, and an electronic device is detected to be connected to a second charging mode;

obtain a charging protocol corresponding to a charging type used in the second charging mode;

adopt one of the first charging path, a second charging path comprising a third switch, and a parallel charging path comprising a second switch to charge the electronic device according to the charging protocol;

control the parallel charging path through the first switch and the second switch; and control the second charging path through the third switch.

* * * * *